United States Patent
Zhong

(10) Patent No.: US 9,952,471 B2
(45) Date of Patent: Apr. 24, 2018

(54) PIXEL ELECTRODE AND LIQUID CRYSTAL DISPLAY PANEL

(71) Applicant: Shenzhen China Star Optoelectronics Technology Co., Ltd., Shenzhen (CN)

(72) Inventor: Xinhui Zhong, Shenzhen (CN)

(73) Assignee: SHENZHEN CHINA STAR OPTOELECRTRONICS TECHNOLOGY CO., LTD., Shenzhen, Guangdong (CN)

( * ) Notice: Subject to any disclaimer, the term of this patent is extended or adjusted under 35 U.S.C. 154(b) by 293 days.

(21) Appl. No.: 14/779,332

(22) PCT Filed: Jul. 24, 2015

(86) PCT No.: PCT/CN2015/085093
§ 371 (c)(1),
(2) Date: Sep. 23, 2015

(87) PCT Pub. No.: WO2016/206157
PCT Pub. Date: Dec. 29, 2016

(65) Prior Publication Data
US 2017/0219889 A1    Aug. 3, 2017

(30) Foreign Application Priority Data
Jun. 25, 2015    (CN) .......................... 2015 1 0359954

(51) Int. Cl.
*G02F 1/1343* (2006.01)
*G02F 1/1362* (2006.01)
*G02F 1/1368* (2006.01)

(52) U.S. Cl.
CPC ...... *G02F 1/134309* (2013.01); *G02F 1/1368* (2013.01); *G02F 1/136286* (2013.01); *G02F 2201/121* (2013.01); *G02F 2201/123* (2013.01)

(58) Field of Classification Search
None
See application file for complete search history.

(56) References Cited

U.S. PATENT DOCUMENTS

2008/0007681 A1*   1/2008   Chen ................. G02F 1/133707
                                                 349/129
2010/0045918 A1*   2/2010   Han ..................... G02F 1/1343
                                                 349/149

(Continued)

FOREIGN PATENT DOCUMENTS

CN          102190723 A       6/2011
CN          102193256 A       9/2011

*Primary Examiner* — Ryan Crockett
(74) *Attorney, Agent, or Firm* — Leong C. Lei

(57) ABSTRACT

A pixel electrode includes a frame electrode, a main electrode orthogonally connected with a middle part of the frame electrode, a plurality of first branch electrodes which are parallel with one another and spaced with one another, and a plurality of second branch electrodes which are parallel with one another and spaced with one another. The first branch electrodes and the second branch electrodes are respectively connected to the frame electrodes at inclination angles of 135° and 45°. The first branch electrodes and the second branch electrodes are orthogonal to each other, and the pixel electrode includes two areas in one sub pixel, in which the first and second branch electrodes are extended from the frame electrode in directions that diverge from each other.

5 Claims, 9 Drawing Sheets

(56) References Cited

U.S. PATENT DOCUMENTS

| | | | | |
|---|---|---|---|---|
| 2010/0110358 A1* | 5/2010 | Um | .................... | G02F 1/134363 |
| | | | | 349/141 |
| 2010/0182521 A1* | 7/2010 | Inoue | ................ | G02F 1/134336 |
| | | | | 349/33 |
| 2012/0307190 A1* | 12/2012 | Zhang | ............... | G02F 1/133707 |
| | | | | 349/142 |
| 2014/0104547 A1* | 4/2014 | Kuo | .................. | G02F 1/133707 |
| | | | | 349/106 |
| 2016/0145492 A1* | 5/2016 | Zhong | .................... | C09K 19/56 |
| | | | | 349/88 |
| 2016/0341991 A1* | 11/2016 | Lee | ....................... | G02F 1/1337 |
| 2016/0349577 A1* | 12/2016 | Zhong | .................. | G02F 1/1337 |
| 2017/0045781 A1* | 2/2017 | Bai | ...................... | G02F 1/1337 |
| 2017/0139278 A1* | 5/2017 | Zhong | .............. | G02F 1/133707 |
| 2017/0146866 A1* | 5/2017 | Zhong | .............. | G02F 1/134309 |
| 2017/0192310 A1* | 7/2017 | Zhong | .............. | G02F 1/134309 |

\* cited by examiner

PIXEL ELECTRODE AND LIQUID CRYSTAL DISPLAY PANEL

FIELD OF THE INVENTION

The present invention relates to a display technology field, and more particularly to a pixel electrode and a liquid crystal display panel.

BACKGROUND OF THE INVENTION

In recent years, the Thin Film Transistor-LCD (TFT-LCD) has been rapidly developed and applied widely. For the TFT-LCD in the mainstream market, three types, which respectively are Twisted Nematic (TN), Super Twisted Nematic (STN), In-Plane Switching (IPS) and Vertical Alignment (VA) can be illustrated. The VA liquid crystal display possesses extremely high contrast than the liquid crystal displays of other types, which can reach up to 4000-8000 in general. It has very wide application in large scale display, such as television or etc.

The reason why the VA liquid crystal display possesses extremely high contrast is that the liquid crystal molecules are vertically aligned to the substrate surface, and no phase difference exists, and light leakage is very small, and the dark state brightness is extremely small at the dark state without applying electricity. The lower the brightness at the dark state can be, the higher the contrast is according to the contrast calculation formula. For vertically aligning the liquid crystal molecules of the VA liquid crystal display to the substrate surface, it is demanded to implement vertical alignment treatment to the liquid crystal molecules. The most common way is to coat vertical alignment solution on specific areas of surfaces of the upper, lower substrates, and the alignment solution generally comprises a large amount of chemical solution NMP (N-methylpyrrolidone) and Polyimide (PI), and then to bake the substrates for a long period at high temperature (generally above 200 degrees) for curing the solvent in the alignment solution. Thus, PI alignment layers are formed on the surfaces of the substrates. As shown in FIG. 1, the traditional VA liquid crystal display comprises an upper glass substrate 100, a lower glass substrate 200 oppositely located to the upper glass substrate 100, a liquid crystal layer 400 sandwiched between the upper glass substrate 100 and the lower glass substrate 200, PI alignment layers 300 formed on a surface of the upper glass substrate 100 facing to the glass substrate 200 and a surface of the lower glass substrate 200 facing to the upper glass substrate 100. However, because the VA liquid crystal display utilizes vertical twist liquid crystals and the birefraction difference of the liquid crystal molecules is larger, the issue of the color shift under large view angle is more serious.

For earning better wide view angle property for the VA liquid crystal display panel to improve the color shift issue, the multi-domain VA (MVA) technology is commonly utilized, which is to divide a sub pixel into many districts and drive the liquid crystals in respective districts to lie down toward different directions as applying voltage. Thus, the watch results from respective directions can be equal. There are many methods for realizing the MVA technology. Please refer to FIG. 2, FIG. 3 and FIG. 4. One of the methods is to process onside of the ITO pixel electrode 70 to be a pozidriv pattern. The common electrode 80 is a plane electrode which has uniform thickness and is uninterruptedly continuous. With the special ITO pixel electrode pattern, the tilt electric field can induce the liquid crystal molecules 50 to fell down toward different directions.

FIG. 2 is a top view diagram of one side of a lower substrate 200 in an MVA liquid crystal display panel. 610 and 620 respectively are a scan line and a data line. One sub pixel is divided into four areas by the pixel electrode 520. The ITO pixel electrode 520 comprises a pozidriv keel 511 as being a main piece and a pattern of pixel electrode branches 512 respectively extending in directions of 45°, 135°, −45° and −135° from the pozidriv keel 511 relative to the horizontal direction with spaced slits. FIG. 3 is a sectional diagram of an MVA type liquid crystal display panel corresponding to A-A portion shown in FIG. 2. The pixel electrode 520 with slits is positioned on the flat lower passivation layer 600. The plane common electrode 510 is positioned on the flat upper passivation layer 601. The PI alignment layers 300 cover on the pixel electrode 520 and the common electrode 510.

According to the transmittance formula of the VA liquid crystal display panel:

$$T = \frac{1}{2}\sin^2 2\Delta\Phi \sin^2 \frac{\Gamma}{2} \quad (1)$$

wherein T is the penetration rate, and Δϕ is the included angle between the long axis of the liquid crystal and the polarizer, of which the efficiency is the maximum as the angle is 45o; Γ is the phase difference, i.e. the modulation result to the polarized light with the liquid crystal molecules driven by the electrical field.

The calculation formula of Γ is:

$$\Gamma = \cos(a) * 2\pi * \Delta n * d/\lambda \quad (2)$$

wherein a is the included angle between the long axis of the liquid crystal and the normal line of the substrate, and the volume is determined according to the electrical fielding affecting the liquid crystal molecules, and d is the cell gap, and Δn is the refractivity difference of the long, short axes of the liquid crystal.

According to the penetration rate formula, in the four areas of the sub pixel, the pixel electrode 520 comprises a pattern of pixel electrode branches 512 respectively extending in directions of 45°, 135°, −45° and −135° relative to the horizontal direction with spaced slits (the direction of the upper, lower polarizers respectively are 0°, 90°). The long axes of the liquid crystal molecules will respectively fell down toward the directions of 45°, 135°, −45° and −135° relative to the horizontal direction. In the penetration rate formula $\sin^2 2\Delta\Phi = 1$, the maximization of the penetration rate can be achieved.

However, the liquid crystal molecules 400 in the area corresponding to the (cross) keel 511 of the pixel electrode 520 as shown in FIG. 2 always cannot fell down as that the liquid crystal molecules in the areas corresponding to the pattern of the pixel electrode branches 512 with spaced slits fell down toward the directions of 45°, 135°, −45° and −135° relative to the horizontal direction. Thus, as shown in FIG. 5, the liquid crystal molecules 400 in the area corresponding to the (cross) keel 511 tilt toward 0° or fell down toward 90° to make $\sin^2 2\Delta\Phi = 0$ in the penetration rate formula. The display is in an opaque state to cause the entire penetration rate of the liquid crystal display panel to descend.

SUMMARY OF THE INVENTION

An objective of the present invention is to provide a pixel electrode, capable of solving the issue that the penetration rate is low because a portion of liquid crystal molecules at the main piece of pozidriv pixel electrode fall down toward the improper directions, to raise the penetration rate for reducing the demand to the backlight brightness of the liquid crystal display panel and lowering the cost and the usage power consumption.

Another objective of the present invention is to provide a liquid crystal display panel, of which the pixel electrode comprises two areas in one sub pixel, and utilizes design of one keel, and the penetration rate is higher, and the demand to the backlight brightness is lower, and the usage power consumption is lower.

For realizing the aforesaid objectives, the present invention provides a pixel electrode, comprising a frame electrode, a main electrode orthogonally connected with a middle part of the frame electrode, a plurality of first branch electrodes which are parallel with one another and spaced with one another, and a plurality of second branch electrodes which are parallel with one another and spaced with one another;

the main electrode divides one side of the frame electrode into a first area and a second area, and the plurality of first branch electrodes are positioned in the first area in a direction with 135° included angle with the frame electrode, and respectively connected with the frame electrode or the main electrode, and the plurality of second branch electrodes are positioned in the second area in a direction with 45° included angle with the frame electrode, and respectively connected with the frame electrode or the main electrode.

The main electrode appears to be zigzag, and comprises a plurality of first electrode sections, and a plurality of second electrode sections orthogonal with and connected to the first electrode sections end to end; the first electrode section or the second electrode section in the main electrode connected with the frame electrode appears a 135° or 45° included angle with the frame electrode;

joints of the plurality of the first electrode sections and the plurality of second electrode sections respectively form a plurality of first bending parts, and a plurality of second bending parts at two sides of the main electrode.

One ends of the plurality of first branch electrodes are respectively connected with the first bending parts, or the frame electrode; one ends of the plurality of second branch electrodes are respectively connected with the second bending parts, or the frame electrode; the plurality of first branch electrodes and the plurality of second branch electrodes are positioned in staggered manner at two sides of the main electrode.

One ends of the plurality of first branch electrodes are respectively connected with the first bending parts, the middles of the second electrode sections, or the frame electrode; one ends of the plurality of second branch electrodes are respectively connected with the second bending parts, the middles of the first electrode sections, or the frame electrode; the plurality of first branch electrodes and the plurality of second branch electrodes are positioned in staggered manner at two sides of the main electrode.

A plurality of first, second electrode gaps are formed among the plurality of first, second branch electrodes; widths of the first, second electrode gaps are the same.

Widths of the first, second branch electrodes are the same, and widths of the first, second electrode sections are the same, and the widths of the first, second branch electrodes and the widths of the first, second electrode sections are the same.

The present invention further provides a pixel electrode, comprising a frame electrode, a main electrode orthogonally connected with a middle part of the frame electrode, a plurality of first branch electrodes which are parallel with one another and spaced with one another, and a plurality of second branch electrodes which are parallel with one another and spaced with one another;

the main electrode divides one side of the frame electrode into a first area and a second area, and the plurality of first branch electrodes are positioned in the first area in a direction with 135° included angle with the frame electrode, and respectively connected with the frame electrode or the main electrode, and the plurality of second branch electrodes are positioned in the second area in a direction with 45° included angle with the frame electrode, and respectively connected with the frame electrode or the main electrode;

wherein the main electrode appears to be zigzag, and comprises a plurality of first electrode sections, and a plurality of second electrode sections orthogonal with and connected to the first electrode sections end to end; the first electrode section or the second electrode section in the main electrode connected with the frame electrode appears a 135° or 45° included angle with the frame electrode;

joints of the plurality of the first electrode sections and the plurality of second electrode sections respectively form a plurality of first bending parts, and a plurality of second bending parts at two sides of the main electrode;

wherein a plurality of first, second electrode gaps are formed among the plurality of first, second branch electrodes; widths of the first, second electrode gaps are the same;

wherein widths of the first, second branch electrodes are the same, and widths of the first, second electrode sections are the same, and the widths of the first, second branch electrodes and the widths of the first, second electrode sections are the same.

The present invention further provides a liquid crystal display panel, comprising an upper substrate, a lower substrate oppositely positioned to the upper substrate, a common electrode positioned at one side of the upper substrate facing the lower substrate, a pixel electrode positioned at one side of the lower substrate facing the upper substrate and a liquid crystal layer sandwiched between the common electrode and the pixel electrode;

the lower substrate comprises scan lines extending along the horizontal direction, data lines extending along the vertical direction and TFTs, and gates of the TFTs are coupled to the scan lines, sources are coupled to the data lines, and drains are coupled to the pixel electrode;

the pixel electrode comprises a frame electrode, a main electrode orthogonally connected with a middle part of the frame electrode, a plurality of first branch electrodes which are parallel with one another and spaced with one another, and a plurality of second branch electrodes which are parallel with one another and spaced with one another;

The main electrode divides one side of the frame electrode into a first area and a second area, and the plurality of first branch electrodes are positioned in the first area in a direction with 135° included angle with the frame electrode, and respectively connected with the frame electrode or the main electrode, and the plurality of second branch electrodes are positioned in the second area in a direction with 45° included angle with the frame electrode, and respectively connected with the frame electrode or the main electrode.

The main electrode appears to be zigzag, and comprises a plurality of first electrode sections, and a plurality of second electrode sections orthogonal with and connected to the first electrode sections end to end; the first electrode section or the second electrode section in the main electrode connected with the frame electrode appears a 135° or 45° included angle with the frame electrode;

joints of the plurality of the first electrode sections and the plurality of second electrode sections respectively form a plurality of first bending parts, and a plurality of second bending parts at two sides of the main electrode.

One ends of the plurality of first branch electrodes are respectively connected with the first bending parts, or the frame electrode; one ends of the plurality of second branch electrodes are respectively connected with the second bending parts, or the frame electrode; the plurality of first branch electrodes and the plurality of second branch electrodes are positioned in staggered manner at two sides of the main electrode.

One ends of the plurality of first branch electrodes are respectively connected with the first bending parts, the middles of the second electrode sections, or the frame electrode; one ends of the plurality of second branch electrodes are respectively connected with the second bending parts, the middles of the first electrode sections, or the frame electrode; the plurality of first branch electrodes and the plurality of second branch electrodes are positioned in staggered manner at two sides of the main electrode.

The benefits of the present invention are: in the liquid crystal display panel of the present invention, the pixel electrode comprises two areas in one sub pixel, and utilizes design of one keel, and the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption. In the liquid crystal display panel of the present invention, the pixel electrode comprises two areas in one sub pixel, and design of one keel is utilized, and the penetration rate is higher, and the demand to the backlight brightness is lower, and the usage power consumption is lower.

BRIEF DESCRIPTION OF THE DRAWINGS

In order to better understand the characteristics and technical aspect of the invention, please refer to the following detailed description of the present invention is concerned with the diagrams, however, provide reference to the accompanying drawings and description only and is not intended to be limiting of the invention.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
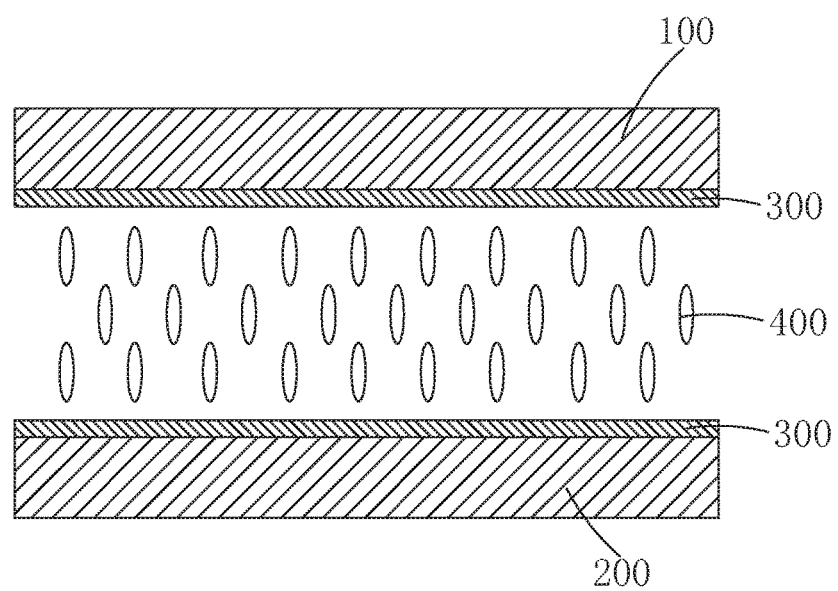
FIG. 1 is a sectional diagram of a VA type liquid crystal display panel according to prior art.
Figure 2:
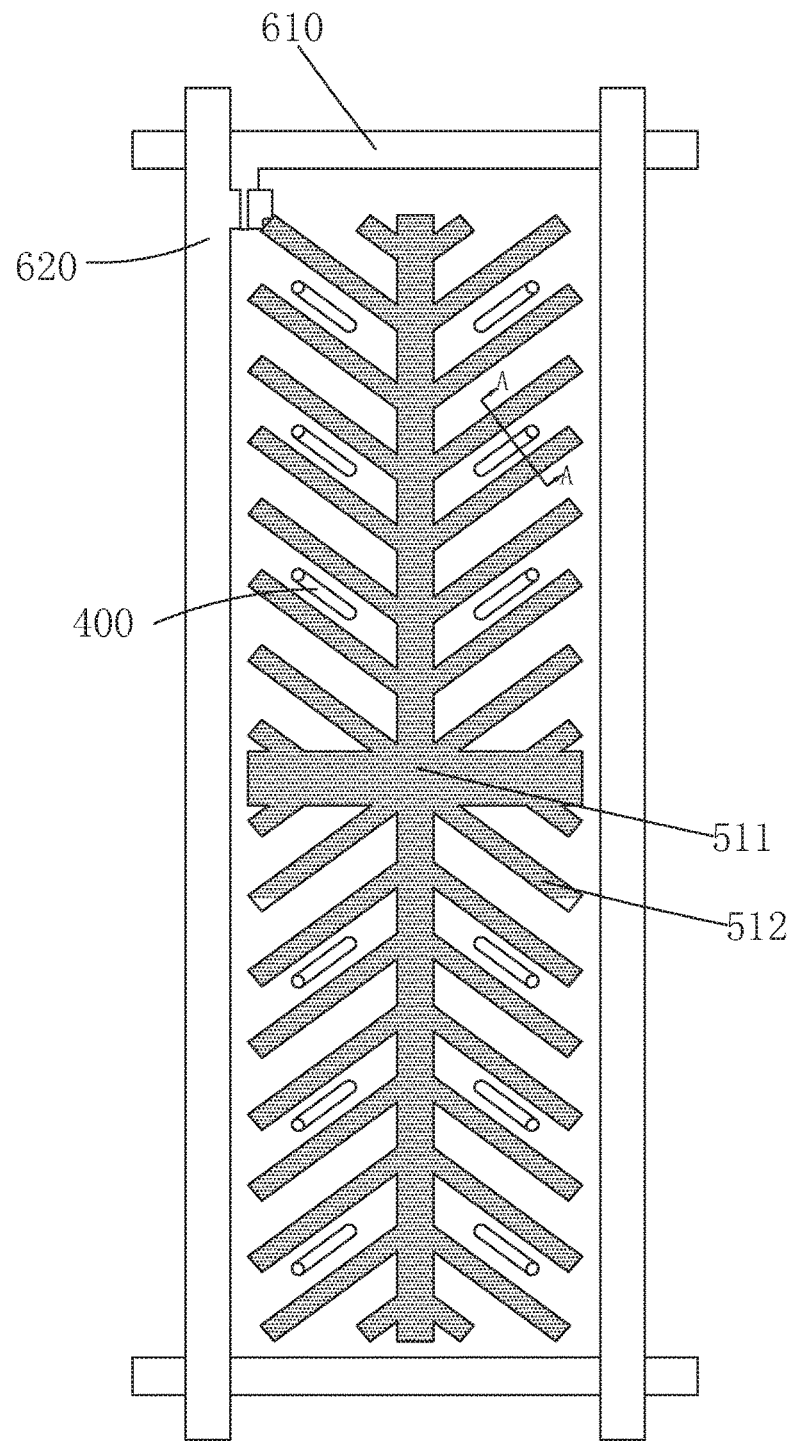
FIG. 2 is a top view diagram of one side of a lower substrate in an MVA type liquid crystal display panel according to prior art.
Figure 3:
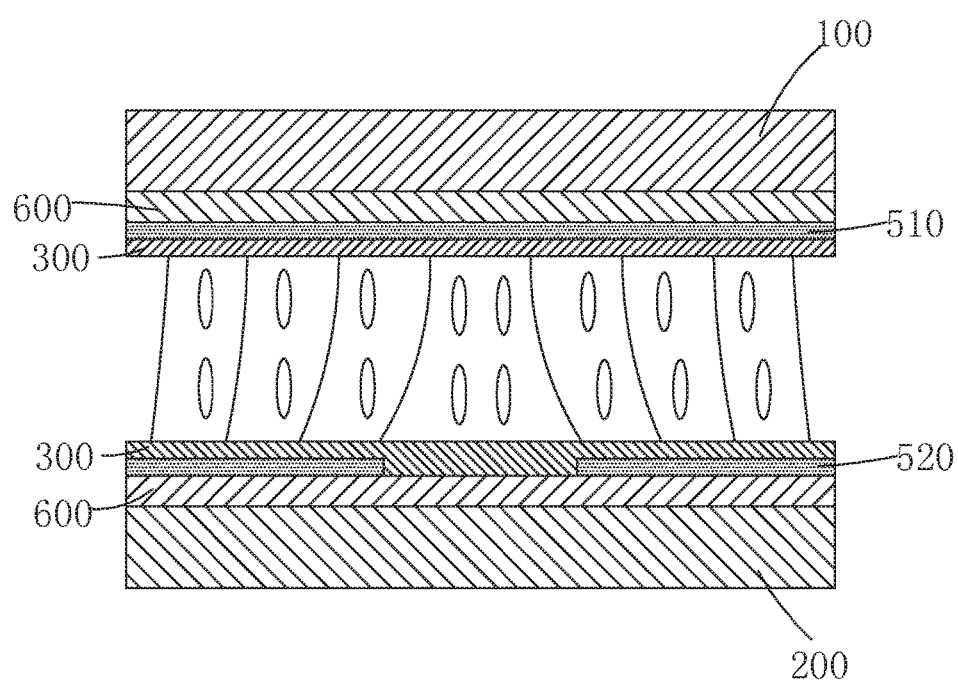
FIG. 3 is a sectional diagram of an MVA type liquid crystal display panel according to prior art corresponding to A-A portion shown in FIG. 2.
Figure 4:
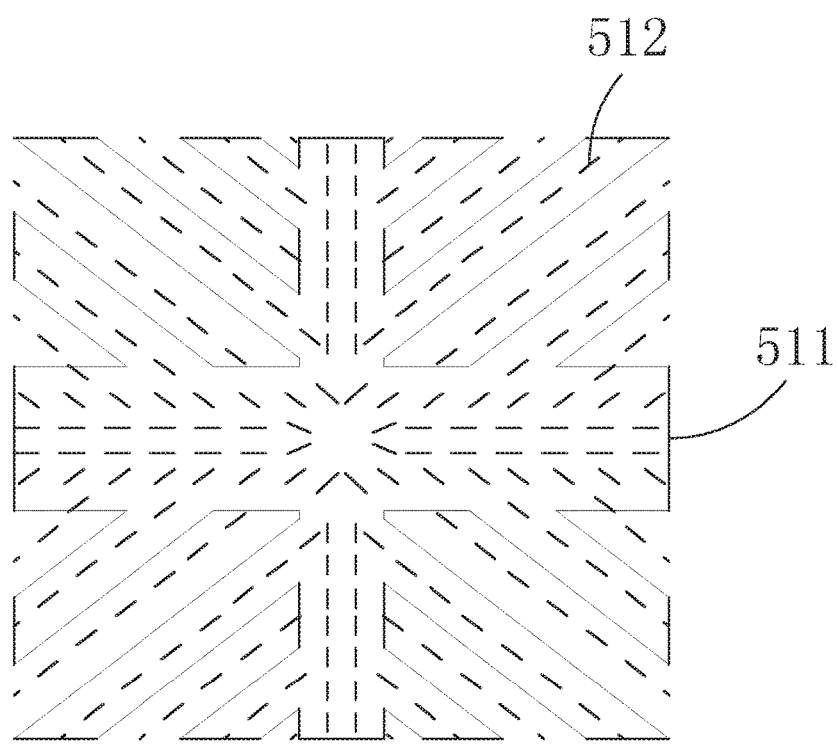
FIG. 4 is a felling direction diagram of liquid crystal molecules in the MVA type liquid crystal display panel shown in FIG. 2.
Figure 5:
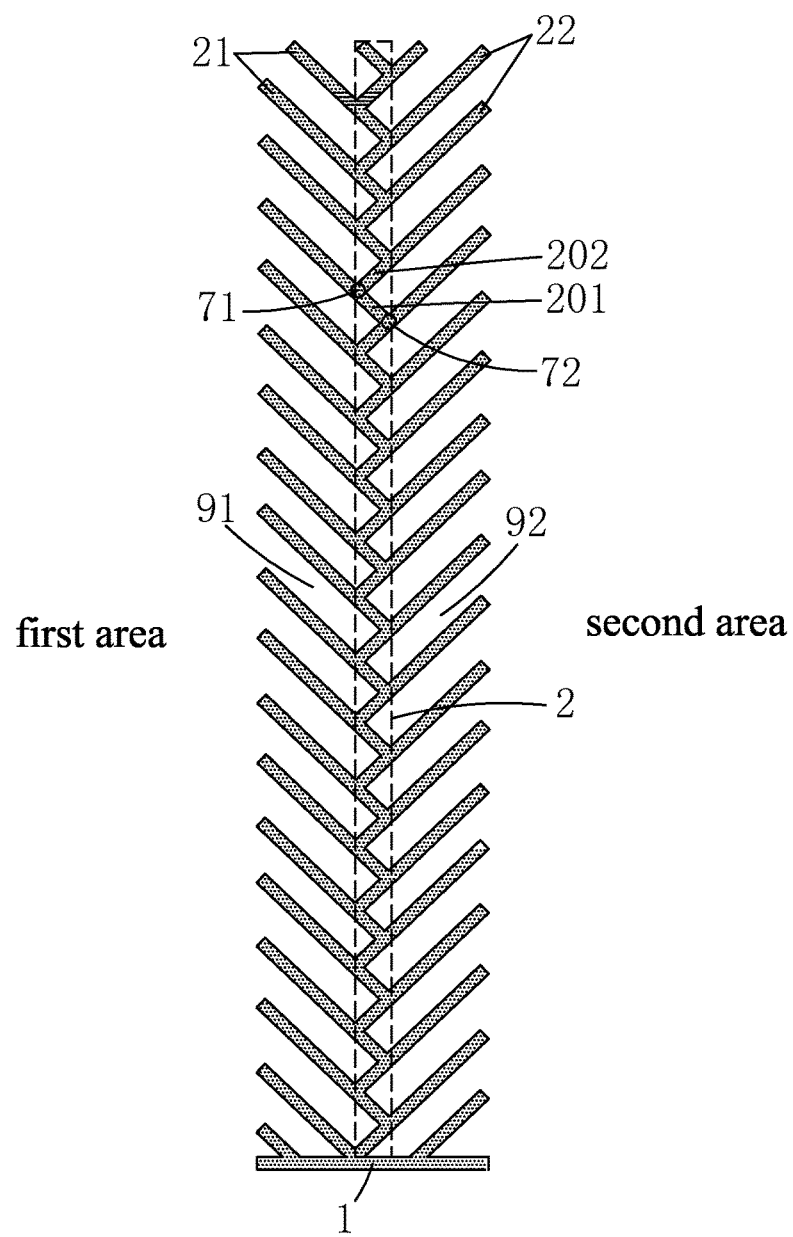
FIG. 5 is a top view diagram of a pixel electrode according to the first embodiment of the present invention.
Figure 6:
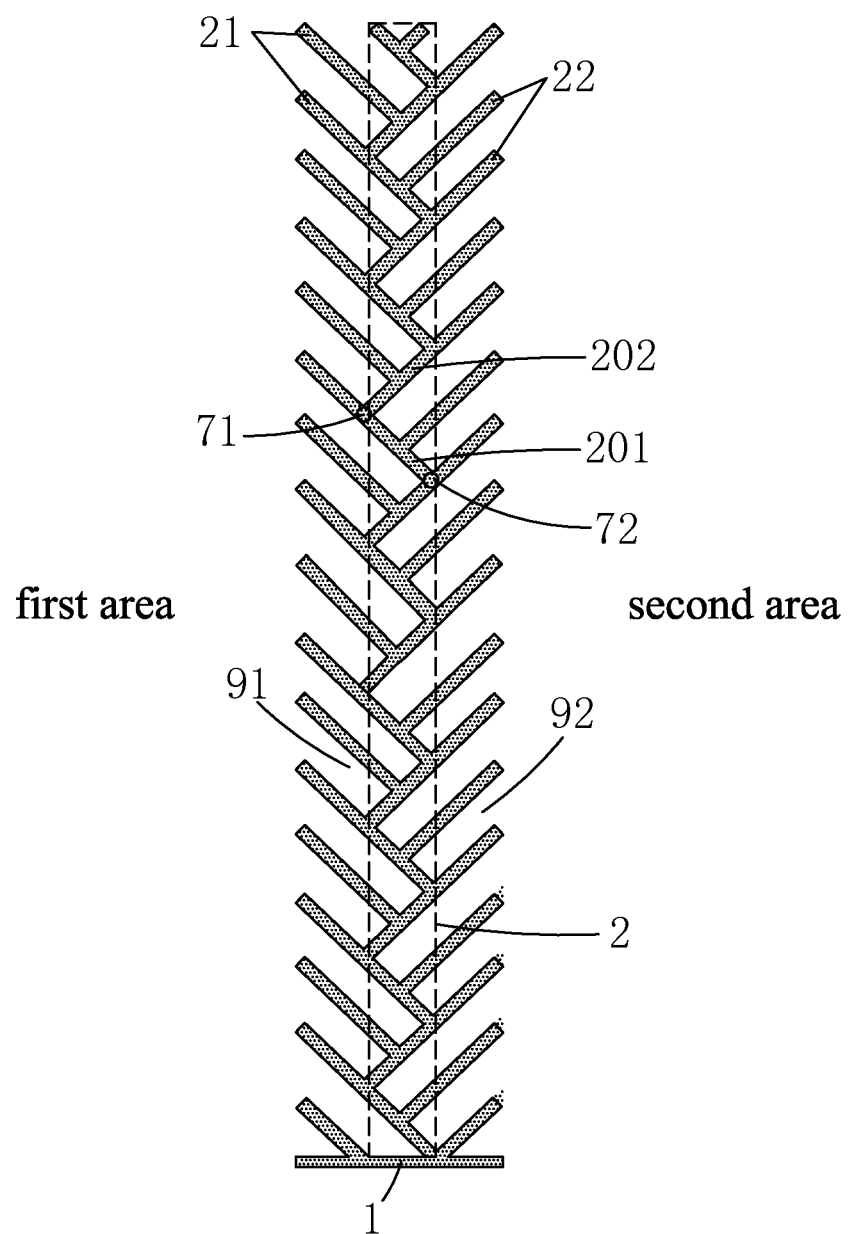
FIG. 6 is a top view diagram of a pixel electrode according to the second embodiment of the present invention.

Please refer from FIG. 5 to FIG. 6. The present invention first provides a pixel electrode, comprising a frame electrode 1, a main electrode 2 orthogonally connected with a middle part of the frame electrode 1, a plurality of first branch electrodes 21 which are parallel with one another and spaced with one another, and a plurality of second branch electrodes 22 which are parallel with one another and spaced with one another;

The main electrode 2 divides one side of the frame electrode 1 into a first area and a second area, and the plurality of first branch electrodes 21 are positioned in the first area in a direction with 135° included angle with the frame electrode 1, and respectively connected with the frame electrode 1 or the main electrode 2, and the plurality of second branch electrodes 22 are positioned in the second area in a direction with 45° included angle with the frame electrode 1, and respectively connected with the frame electrode 1 or the main electrode 2.

FIG. 5 shows the first embodiment of the pixel electrode according to the present invention. The main electrode 2 appears to be zigzag, and comprises a plurality of first electrode sections 201, and a plurality of second electrode sections 202 orthogonal with and connected to the first electrode sections 201 end to end; the first electrode section 201 or the second electrode section 202 in the main electrode 2 connected with the frame electrode 1 appears a 135° or 45° included angle with the frame electrode 1.

Joints of the plurality of the first electrode sections 201 and the plurality of second electrode sections 202 respectively form a plurality of first bending parts 71, and a plurality of second bending parts 72 at two sides of the main electrode 2.

One ends of the plurality of first branch electrodes 21 are respectively connected with the first bending parts 71, or the frame electrode 1; one ends of the plurality of second branch electrodes 22 are respectively connected with the second bending parts 72, or the frame electrode 1; the plurality of first branch electrodes 21 and the plurality of second branch electrodes 22 are positioned in staggered manner at two sides of the main electrode 2.

In the first embodiment, the plurality of first branch electrodes 21, the plurality of second branch electrodes 22 respectively correspond to left, right, two areas in one sub pixel, and the arrangement of only the main electrode 2, i.e. design of the structure only one keel is utilized, and the main electrode 2 is arranged to appear to be zigzag, the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption.

FIG. 6 shows the second embodiment of the pixel electrode according to the present invention. The difference from the first embodiment is: one ends of the plurality of first branch electrodes 21 are respectively connected with the first bending parts 71, the middle of the second electrode sections 202, or the frame electrode 1; one ends of the plurality of second branch electrodes 22 are respectively connected with the second bending parts 72, the middle of the first electrode sections 201, or the frame electrode 1; the plurality of first branch electrodes 21 and the plurality of second branch electrodes 22 are positioned in staggered manner at two sides of the main electrode 2.

In the second embodiment, the plurality of first branch electrodes 21, the plurality of second branch electrodes 22 respectively correspond to left, right, two areas in one sub pixel, and the arrangement of only the main electrode 2, i.e. design of the structure only one keel is utilized, and the main electrode 2 is arranged to appear to be zigzag, the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption.

Specifically, in the aforesaid first and second embodiments, a plurality of first, second electrode gaps 91, 92 are formed among the plurality of first, second branch electrodes 21, 22; widths of the first, second electrode gaps 91, 92 are the same.

Specifically, widths of the first, second branch electrodes 21, 22 are the same; widths of the first, second electrode sections 201, 202 are the same.

Preferably, widths of the first, second electrode sections 201, 202 and widths of the first, second branch electrodes 21, 22 are the same.

Preferably, material of the pixel electrode is ITO.

As the pixel electrode of the present invention is applied in a liquid crystal display panel, the plurality of first, second pixel branch electrodes 21, 22 respectively correspond to two areas of one sub pixel. As applying voltage to the liquid crystal display panel, because the pixel electrode of the present invention does not utilize the structure of the (cross) keel but utilizes one keel, and the keel is arrange to be appear to zigzag, the active area is enlarged to reduce the issue that the liquid crystal molecules fall down toward the improper directions and to make the liquid crystal molecules in the region corresponding to the original structure of the (cross) keel to be aligned along the direction of 45 degree as more as possible. The liquid crystal molecules in two areas of one sub pixel respectively fall down with 45° included angles with the frame electrode. Thus, the liquid crystal efficiency is maximized, and the penetration rate is promoted.

In the aforesaid liquid crystal display panel, the pixel electrode comprises two areas in one sub pixel, and utilizes design of one keel, and the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption.

On the basis of the same inventive idea, the present invention further provides a liquid crystal display panel. Please refer to FIGS. 7-9. The liquid crystal display panel of the present invention comprises: an upper substrate 10, a lower substrate 20 oppositely positioned to the upper substrate 10, a common electrode 51 positioned at one side of the upper substrate 10 facing the lower substrate 20, a pixel electrode 52 positioned at one side of the lower substrate 20 facing the upper substrate 10 and a liquid crystal layer 40 sandwiched between the common electrode 51 and the pixel electrode 52.

The lower substrate 20 comprises scan lines 61 extending along the horizontal direction, data lines 62 extending along the vertical direction and TFTs, and gates of the TFTs are coupled to the scan lines 61, sources are coupled to the data lines 62, and drains are coupled to the pixel electrode 52.

Figure 7:
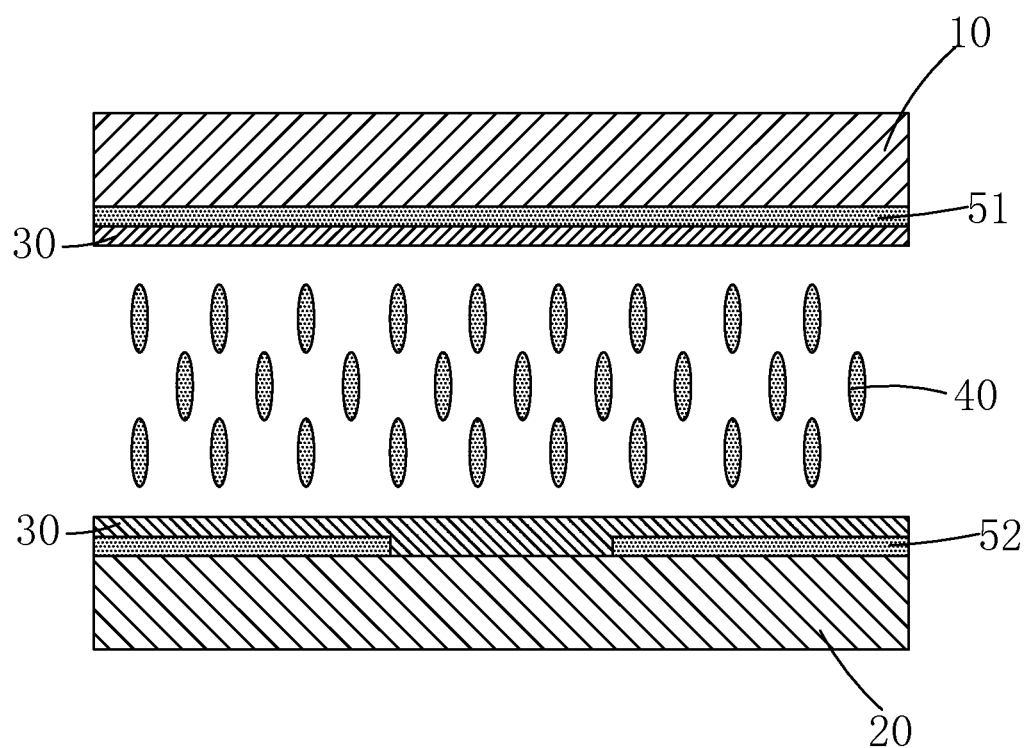
FIG. 7 is a sectional structure diagram of a liquid crystal display panel according to the present invention.

FIG. 7 further shows an alignment layer 30 covering the common electrode 51 and the pixel electrode 52 for implementing alignment to the liquid crystal layer 40. Certainly, it is possible to not to provide the alignment layer 30 but the polymer-stabilized vertical alignment (PSVA) is utilized to implement alignment to the liquid crystal layer 40.

Figure 8:
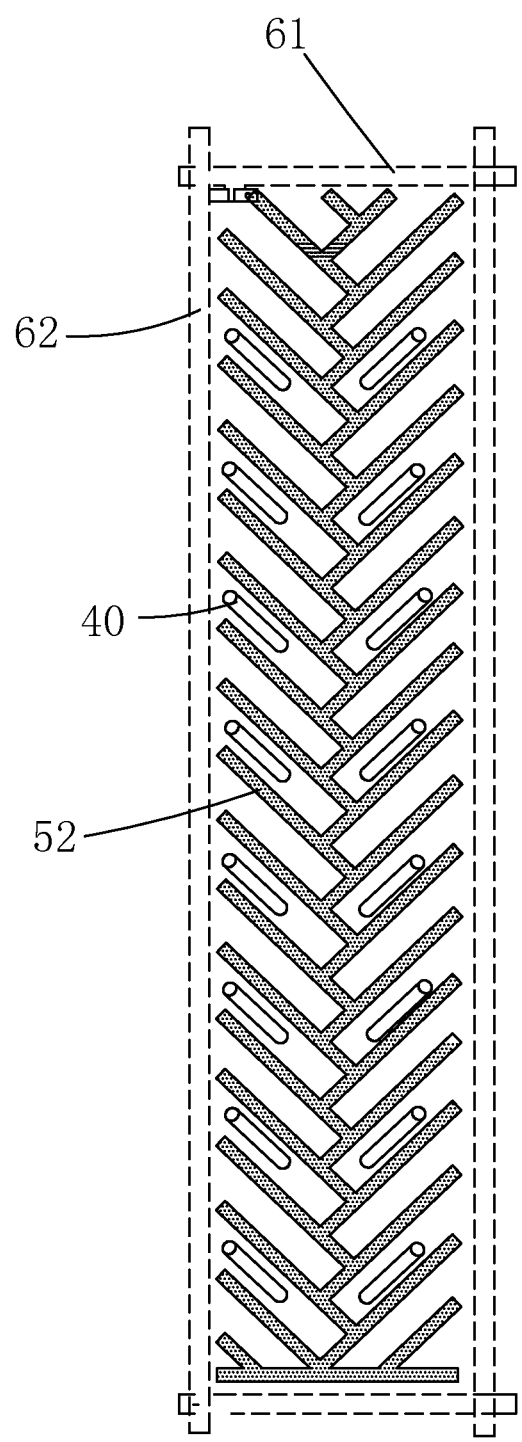
FIG. 8 is the first top view diagram of one side of a lower substrate in the liquid crystal display panel according to the present invention.
Figure 9:
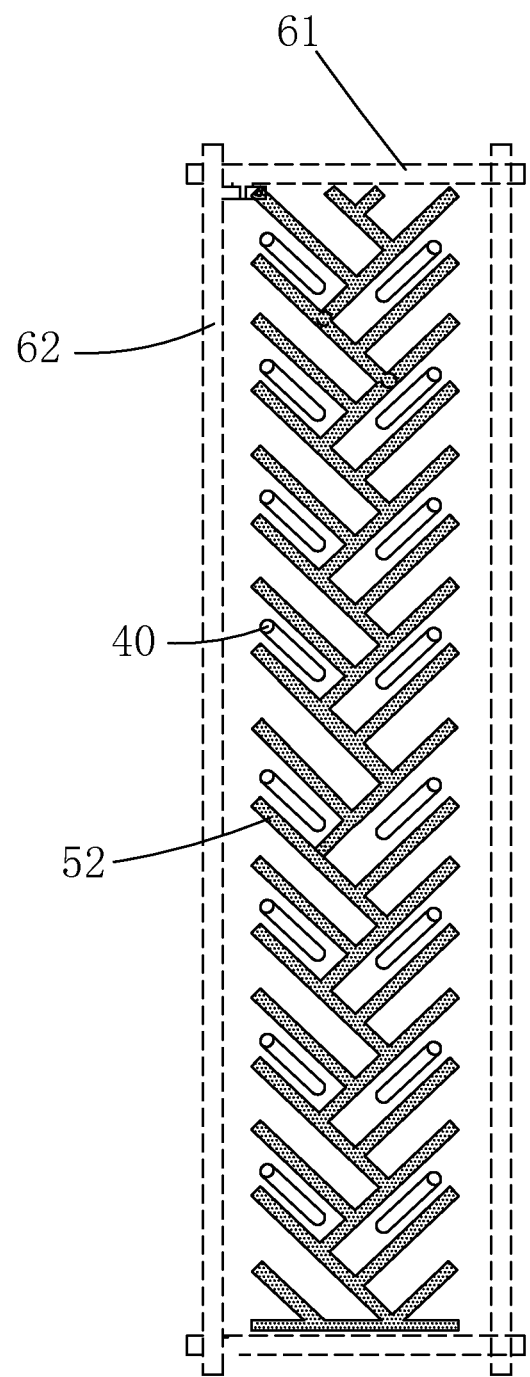
FIG. 9 is the second top view diagram of one side of a lower substrate in the liquid crystal display panel according to the present invention.

Specifically, referring from FIGS. 8-9 and with the FIGS. 5-6 at the same time, the pixel electrode 52 comprises a frame electrode 1, a main electrode 2 orthogonally connected with a middle part of the frame electrode 1, a plurality of first branch electrodes 21 which are parallel with one another and spaced with one another, and a plurality of second branch electrodes 22 which are parallel with one another and spaced with one another;

The main electrode 2 divides one side of the frame electrode 1 into a first area and a second area, and the plurality of first branch electrodes 21 are positioned in the first area in a direction with 135° included angle with the frame electrode 1, and respectively connected with the frame electrode 1 or the main electrode 2, and the plurality of second branch electrodes 22 are positioned in the second area in a direction with 45° included angle with the frame electrode 1, and respectively connected with the frame electrode 1 or the main electrode 2.

Please refer from FIG. 8 to FIG. 9. The pixel electrode 52 at one side of the lower substrate 20 can utilize any one structure of the first and second embodiment of the aforesaid pixel electrode. The repeated description is omitted here.

In the aforesaid liquid crystal display panel, the pixel electrode comprises two areas in one sub pixel, and design of one keel is utilized, and the penetration rate is higher, and the demand to the backlight brightness is lower, and the usage power consumption is lower.

In conclusion, in the liquid crystal display panel of the present invention, the pixel electrode comprises two areas in one sub pixel, and utilizes design of one keel, and the active area is enlarged to solve the issue that the penetration rate is low because the liquid crystal molecules at the structure of the (cross) keel of pozidriv pixel electrode fall down toward the improper directions, to raise the penetration rate for reducing the demand to the backlight brightness of the liquid crystal display panel and lowering the cost and the usage power consumption. In the liquid crystal display panel of the present invention, one sub pixel comprises two areas, and design of one keel is utilized, and the penetration rate is higher, and the demand to the backlight brightness is lower, and the usage power consumption is lower.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A pixel electrode, comprising a frame electrode, a main electrode orthogonally connected with a middle part of the frame electrode, a plurality of first branch electrodes which are parallel with one another and spaced with one another, and a plurality of second branch electrodes which are parallel with one another and spaced with one another;

wherein the main electrode divides one side of the frame electrode into a first area and a second area, and the plurality of first branch electrodes are positioned in the first area in a direction of 135° inclination with respect to the frame electrode and are each connected with the frame electrode or the main electrode, and the plurality of second branch electrodes are positioned in the second area in a direction of 45° inclination with respect to the frame electrode and are each connected with the frame electrode or the main electrode;

wherein the plurality of first branch electrodes and the plurality of second branch electrodes are arranged to extend from the frame electrode or the main electrode in a manner of diverging from each other toward respective distal free ends;

wherein the main electrode comprises a zigzag configuration that comprises a plurality of first electrode sections and a plurality of second electrode sections orthogonal with and connected to the first electrode sections end to end; wherein one of the first electrode sections or one of the second electrode sections of the main electrode is connected with the frame electrode at an inclination angle of 135° or 45° with respect to the frame electrode;

wherein the connections between the plurality of the first electrode sections and the plurality of second electrode sections respectively form a plurality of first bending parts and a plurality of second bending parts at two sides of the main electrode; and wherein the plurality of first branch electrodes have ends that are respectively connected with the first bending parts, middles of the first electrode sections, or the frame electrode, the plurality of second branch electrodes have ends that are respectively connected with the second bending parts, middles of the first electrode sections, or the frame electrode; the plurality of first branch electrodes and the plurality of second branch electrodes are positioned in a staggered manner at two sides of the main electrode and extending in directions to diverge from each other; and wherein a first one of the first branch electrodes is arranged to have the end thereof connected with the frame electrode and is connected with two of the second branch electrodes and remaining ones of the first branch electrodes are each connected with three of the second branch electrodes, and wherein the second branch electrodes are each connected to three of the first branch electrodes.

2. The pixel electrode according to claim 1, wherein a plurality of first electrode gaps and a plurality of second electrode gaps are formed among the plurality of first branch electrodes and the second branch electrodes, respectively; and widths of the first and second electrode gaps are the same.

3. The pixel electrode according to claim 1, wherein widths of the first and second branch electrodes are the same; widths of the first and second electrode sections are the same; and the widths of the first and second branch electrodes and the widths of the first and second electrode sections are the same.

4. A pixel electrode, comprising a frame electrode, a main electrode orthogonally connected with a middle part of the frame electrode, a plurality of first branch electrodes which are parallel with one another and spaced with one another, and a plurality of second branch electrodes which are parallel with one another and spaced with one another;

wherein the main electrode divides one side of the frame electrode into a first area and a second area, and the plurality of first branch electrodes are positioned in the first area in a direction of 135° inclination with respect to the frame electrode and are each connected with the frame electrode or the main electrode, and the plurality of second branch electrodes are positioned in the second area in a direction of 45° inclination with respect to the frame electrode and are each connected with the frame electrode or the main electrode;

wherein the plurality of first branch electrodes and the plurality of second branch electrodes are arranged to extend from the frame electrode or the main electrode in a manner of diverging from each other toward respective distal free end;

wherein the main electrode comprises a zigzag configuration that comprises a plurality of first electrode sections and a plurality of second electrode sections orthogonal with and connected to the first electrode sections end to end; wherein one of the first electrode sections or one of the second electrode sections of the main electrode is connected with the frame electrode at an inclination angle of 135° or 45° with respect to the frame electrode;

wherein the connections between the plurality of the first electrode sections and the plurality of second electrode sections respectively form a plurality of first bending parts and a plurality of second bending parts at two sides of the main electrode;

wherein a plurality of first electrode gaps and a plurality of second electrode gaps are formed among the plurality of first branch electrodes and the second branch electrodes, respectively; and widths of the first and second electrode gaps are the same;

wherein widths of the first and second branch electrodes are the same; widths of the first and second electrode sections are the same; and the widths of the first and second branch electrodes and the widths of the first and second electrode sections are the same; and wherein the plurality of first branch electrodes have ends that are respectively connected with the first bending parts, middles of the first electrode sections, or the frame electrode; the plurality of second branch electrodes have ends that are respectively connected with the second bending parts, middles of the first electrode sections, or the frame electrode; the plurality of first branch electrodes and the plurality of second branch electrodes are positioned in a staggered manner at two sides of the main electrode and extending in directions to diverge from each other; and wherein a first one of the first branch electrodes is arranged to have the end thereof connected with the frame electrode and is connected with two of the second branch electrodes and remaining ones of the first branch electrodes are each connected with three of the second branch electrodes, and wherein the second branch electrodes are each connected to three of the first branch electrodes.

5. A liquid crystal display panel, comprising an upper substrate, a lower substrate oppositely positioned to the upper substrate, a common electrode positioned at one side of the upper substrate facing the lower substrate, a pixel electrode positioned at one side of the lower substrate facing the upper substrate and a liquid crystal layer sandwiched between the common electrode and the pixel electrode;

wherein the lower substrate comprises scan lines extending along the horizontal direction, data lines extending along the vertical direction and TFTs, the TFTs have gates that are coupled to the scan lines, sources that are coupled to the data lines, and drains that are coupled to the pixel electrode;

wherein the pixel electrode comprises a frame electrode, a main electrode orthogonally connected with a middle part of the frame electrode, a plurality of first branch electrodes which are parallel with one another and spaced with one another, and a plurality of second branch electrodes which are parallel with one another and spaced with one another;

wherein the main electrode divides one side of the frame electrode into a first area and a second area, and the plurality of first branch electrodes are positioned in the first area in a direction of 135° inclination with respect to the frame electrode and are each connected with the frame electrode or the main electrode, and the plurality of second branch electrodes are positioned in the second area in a direction of 45° inclination with respect to the frame electrode and are each connected with the frame electrode or the main electrode;

wherein the plurality of first branch electrodes and the plurality of second branch electrodes are arranged to extend from the frame electrode or the main electrode in a manner of diverging from each other toward respective distal free ends;

wherein the main electrode comprises a zigzag configuration that comprises a plurality of first electrode sections and a plurality of second electrode sections orthogonal with and connected to the first electrode sections end to end; wherein one of the first electrode sections or one of the second electrode sections of the main electrode is connected with the frame electrode at an inclination angle of 135° or 45° with respect to the frame electrode;

wherein the connections between the plurality of the first electrode sections and the plurality of second electrode sections respectively form a plurality of first bending parts and a plurality of second bending parts at two sides of the main electrode; and wherein the plurality of first branch electrodes have ends that are respectively connected with the first bending parts, middles of the first electrode sections, or the frame electrode; the plurality of second branch electrodes have ends that are respectively connected with the second bending parts, middles of the first electrode sections, or the frame electrode; the plurality of first branch electrodes and the plurality of second branch electrodes are positioned in a staggered manner at two sides of the main electrode and extending in directions to diverge from each other; and wherein a first one of the first branch electrodes is arranged to have the end thereof connected with the frame electrode and is connected with two of the second branch electrodes and remaining ones of the first branch electrodes are each connected with three of the second branch electrodes, and wherein the second branch electrodes are each connected to three of the first branch electrodes.

* * * * *